July 14, 1970

J. T. FORBES 3,520,800

PURIFYING HYDROGEN GAS EFFLUENT FROM A CATALYTIC
REFORMING PROCESS
Filed Sept. 30, 1968

INVENTOR:
James T. Forbes

BY: James R. Hoatson, Jr.
Joseph E. Mason, Jr.
ATTORNEYS

United States Patent Office 3,520,800
Patented July 14, 1970

3,520,800
PURIFYING HYDROGEN GAS EFFLUENT FROM A CATALYTIC REFORMING PROCESS
James T. Forbes, Arlington Heights, Ill., assignor to Universal Oil Products Company, Des Plaines, Ill., a corporation of Delaware
Filed Sept. 30, 1968, Ser. No. 763,579
Int. Cl. C10g 5/04, 35/18
U.S. Cl. 208—101                5 Claims

ABSTRACT OF THE DISCLOSURE

Process for the catalytic reforming of hydrocarbons in the presence of hydrogen, preferably, to produce high quality gasoline boiling range products. Relatively impure hydrogen for recycle purposes and for other uses is provided by compressing and contacting this hydrogen with a portion of the liquid phase reformed product. Processing technique permits maximum recovery of normally gaseous hydrocarbons as well as reformate.

BACKGROUND OF THE INVENTION

This invention relates to a method for the conversion of hydrocarbons. It also relates to a process for the dehydrogenation of hydrocarbons. It particularly relates to the catalytic reforming of hydrocarbons to produce gasoline boiling range products. It specifically relates to a method for upgrading the hydrogen gas for recycle to the catalytic reforming reaction zone and for purifying the net hydrogen gas stream which may be used in other hydrogen consuming reactions.

It is well known in the art that high quality gasoline boiling range products, such as aromatic hydrocarbons, e.g. benzene, toluene, and xylene, may be produced by the catalytic reforming process wherein naphtha-containing feedstocks are passed over platinum-containing catalyst in the presence of hydrogen in order to convert at least a portion of the feedstock into aromatic hydrocarbons. One of the predominant reactions in catalytic reforming involves dehydrogenation of naphthenic hydrocarbons. The dehydrogenation function produces a net excess of hydrogen from the process which is available for other uses, such as hydrodesulfurization reactions, and the like. A considerable portion of the produced hydrogen, however, is required for recycle purposes in order that a proper partial pressure of hydrogen may be maintained over the catalyst in the catalytic reforming zone.

However, the catalytic reforming reaction also involves a hydrocracking function which segments hydrocarbons into relatively low molecular weight hydrocarbons, e.g. normally gaseous hydrocarbons, such as methane, ethane, propane, butane, etc. and, in particular, $C_2+$ hydrocarbons which then become contaminants in the gaseous hydrogen which is separated from the effluent of the reaction zone. These contaminants have the effect of lowering the hydrogen purity to such an extent that frequently external purification techniques must be used by those skilled in the art before the net hydrogen from the reformer can be used in other chemical reactions requiring relatively high purity hydrogen. Low hydrogen purity also has a significant effect on the reforming reaction by the way of requiring considerable quantities of such low purity hydrogen in order to maintain the hydrogen partial pressure in the reaction zone at the proper level, as previously mentioned.

As those skilled in the art are familiar, the reforming reaction must have a hydrogen atmosphere in order for the various desired reactions to take place. This means, of course, that the separated hydrogen gas referred to hereinabove must, to a considerable extent, be returned to the catalytic reforming zone. Due to the large pressure drop through a conventional catalytic reforming system, typically having a plurality of catalytic reactors and separation vessels, the separated gas for recycle purposes must be compressed to at least the pressure of the reaction zone before it can be returned and properly used. Heretofore, the size of the hydrogen gas compressed has been a significant cost factor in constructing and operating catalytic reforming units for the production of gasoline boiling range products, such as benzene, toluene, and xylene. In other words, the large horsepower requirement for the recycle hydrogen compressor is a substantial capital investment item and a substantial operating cost item for any catalytic reforming unit.

Still further, there has been a trend in the catalytic reforming technology which is predicated on the theory that the reforming reaction should be carried out at a relatively low pressure; that is, a reaction zone pressure of less than 200 p.s.i.g. Consequently, since the other hydrogen consuming reactions, such as hydrodesulfurization, are operated at pressures considerably above 200 p.s.i.g., there is associated with prior art processes the additional expense of compressing the net tail gas from a catalytic reformer up to the operating pressure of these other hydrogen consuming processes.

Consequently, it would be desirable to operate the catalytic reforming process so as to produce relatively high purity hydrogen not only for recycle purposes, but also for other uses outside the catalytic reforming system. Furthermore, it would be highly desirable to operate the catalytic reforming process in a more economical and facile manner while maintaining product quality and quanity at predetermined levels.

SUMMARY OF THE INVENTION

Therefore, it is an object of this invention to provide an improved method for the conversion of hydrocarbons in the presence of hydrogen.

It is another object of this invention to provide a method for the dehydrogenation of hydrocarbons.

It is a still further object of this invention to provide an improved method for the catalytic reforming of hydrocarbons to produce gasoline boiling range products in a facile and economical manner.

It is a particular object of this invention to provide a method for purifying the produced hydrogen from a catalytic reforming operation.

Accordingly, the present invention provides a method for the conversion of hydrocarbons in the presence of hydrogen which comprises converting feed hydrocarbons in a reaction zone under hydrogen producing conditions including a relatively low pressure; separating the effluent from the reaction zone under said relatively low pressure into a hydrocarbon liquid phase and a hydrogen-containing gas phase; increasing the pressure of said gas phase and said liquid phase to a relatively high pressure; admixing said high pressure gas and high pressure liquid phases and separating the resulting admixture into a recycle hydrogen gas stream and a liquid hydrocarbon stream; returning a portion of said recycle gas to said reaction zone; cooling the remaining portion of said recycle gas under conditions sufficient to condense at least a portion of the hydrocarbons contained therein; separating said cooled gas into a gaseous stream and a liquid fraction containing said condensed hydrocarbons; admixing said condensed hydrocarbons and said liquid hydrocarbon stream; introducing said admixture into a fractionation zone under conditions sufficient to produce a first product stream comprising normally gaseous hydrocarbons and a second product stream comprising normally liquid conversion products.

Another embodiment of this invention includes the method hereinabove wherein said relatively high pressure is at least 50 p.s.i.g. higher than said relatively low pressure.

Thus, it can be seen from the above embodiments that this inventive flow scheme embodies the concept of operating a conversion zone at a relatively low pressure, separating the effluent into a gaseous stream and a liquid stream, compressing the gaseous stream to a relatively high pressure, contacting the compressed gas with the separated liquid stream, further separating the contacted mixture into a gaseous stream and a liquid stream, cooling a portion of the gaseous stream for further separation of liquid hydrocarbons, returning the remaining portion of the gaseous stream to the reaction zone, and then separating the desired conversion products from the commingled liquid stream separated herein.

DETAILED DESCRIPTION OF THE INVENTION

The art of catalytic reforming and the broad art of dehydrogenation of hydrocarbons is well known to those skilled in the art and need not be discussed in great detail herein. However, in brief, suitable charge stocks for use in the catalytic reforming operation to produce gasoline boiling range products, such as aromatic hydrocarbons are those which contain both naphthenes and paraffins in relatively high concentration. Such feedstocks include narrow boiling range fractions, such as naphtha fractions, as well as substantially pure materials, such as cyclohexane, methylcyclohexane, and the like. The preferred class of suitable feedstocks for the catalytic reforming operation includes primarily straight-run gasolines, such as the light and heavy naphthas. It is distinctly preferred to use a naphtha fraction boiling between, say, 90° F. and 450° F. as the feedstock to the catalytic reforming operation.

The preferred types of catalyst for use in the catalytic reforming process are well known to those skilled in the art and, typically, comprise platinum on an alumina support. These catalysts may contain substantial amounts of platinum, but for economic and quality reasons, the platinum will, typically, be within the range from 0.05% to 5.0% by weight platinum.

Satisfactory operating conditions for the catalytic reforming operation include the presence of the hereinabove mentioned catalysts and temperatures of about 500° F. to about 1050° F., preferably, from 600° F. to 1000° F.; pressures from about 50 p.s.i.g. to about 1200 p.s.i.g., preferably, from about 100 p.s.i.g. to 300 p.s.i.g.; a weight hourly space velocity within the range from about 0.2 to 40; and the presence of a hydrogen-containing gas equivalent to a hydrogen to hydrocarbon mol ratio of about 0.5 to about 15.0.

Conventionally, the catalytic reforming operation is carried out in a fixed bed reaction zone. Usually a plurality of catalyst beds are also used either in stacked fashion within a single reactor shell or, more preferably, in separate reactors. A single reactor with a single catalyst bed may be utilized, but, preferably, a plurality of catalyst beds are used. Still more preferably, in the practice of this invention from 2 to 5 catalyst beds maintained in separate reactor vessels are utilized. As an example, four (4) separate reactor beds are used to illustrate the preferred embodiment of this invention.

The amount of catalyst used in each reactor bed may be varied considerably depending upon the characteristics of the feedstock and the purpose for which the conversion reaction is carried out. In the preferred embodiment of this invention, for example, the catalyst may be deposed in the separate reactors in the following manner: 10%, 15%, 25%, and 50% by weight catalyst, respectively. Other variations of reactor geometry and catalyst volume will be evident to those skilled in the art from general knowledge and the specific teachings presented herein.

In the practice of this invention, it is distinctly preferred that the relatively high pressure be at least 50 p.s.i.g. greater than the relatively low pressure. In other aspects, it is distinctly preferred that the catalytic reforming reaction be carried out at the lower end of the pressure scale rather than at the higher end, to wit: from 85 p.s.i.g. to 200 p.s.i.g. Although not mentioned in detail, it is to be noted that the liquid phase from the relatively low pressure separation zone will have to be pumped into the relatively high pressure discharge line from the compressor so that the separation can be made at the relatively high pressure.

The unique features of this invention may be best understood by a comparison with well known prior art schemes. Normally, the prior art scheme will operate the catalytic reforming operation at 300 to 450 p.s.i.g. The separator following the reaction zone is at substantially the same pressure, allowing for pressure drop through the system. The prior art scheme separates the hydrogen-containing phase from this separator and, generally, passes a portion of this hydrogen back to the reaction zone. Since the entire catalytic reforming system has significant pressure drop, this recycle hydrogen gas stream must be compressed in order to overcome the pressure drop. The desired reformed product or reformate according to the prior art schemes is removed from the same separator and passed into recovery means, such as a solvent extraction system. With reference to the description of this invention, it can be seen that the present invention has at least the added features of compressing the gaseous stream, admixing the compressed gas, preferably with all of the liquid product and then making an additional separation of the hydrogen gas at relatively high pressure. More unique, however, the present invention then takes the net hydrogen gas at this relatively high pressure and cools it to within a critical temperature range. The cooled net stream is then further separated into a purified hydrogen product stream for use in other processes and a liquid stream which is commingled with other liquid products and sent into conventional recovery means as previously mentioned. The combined effect, according to this invention, of compressing, contacting, and cooling successfully removes a significant portion of the hydrocarbon contaminants from the hydrogen gas stream without increasing either capital investment costs or operating expenses to any significant extent.

The invention may be more fully understood with reference to the appended drawing which is a schematic representation of apparatus for practicing one embodiment of the present invention.

DESCRIPTION OF THE DRAWING

A petroleum-derived naphtha fraction is introduced via line 10 into catalytic reforming zone 11 which contains a platinum catalyst and is operated under conventional reforming conditions including the relatively low pressure as previously mentioned. To illustrate the mechanics of this invention, however, the operating pressure of catalytic reforming zone 11 is chosen to be at about 175 p.s.i.g. at the inlet to the catalytic reactors. The total effluent from the catalytic reforming zone is withdrawn via line 13, cooled by means of condensers not shown, and passed into low pressure separation zone 14 at a pressure of about 100 p.s.i.g.

The pressure of separation zone 14 is deemed to be substantially that maintained in reaction zone 11, although, it is actually at a lower than reaction pressure due to the pressure drop through the system. Sufficient separation means, including residence time, is imposed on zone 14 so that a relatively impure hydrogen stream is separated via line 15 and a predominantly liquid product stream is separated and removed via line 16. The material in line 16 contains the reformed hydrocarbons, to wit: gasoline boiling range hydrocarbons, such as benzene, toluene, and xylene.

The relatively impure hydrogen-containing stream in line 15 is passed into compressor 17 wherein the pressure is raised at least 50 p.s.i.g. and, preferably, to about 220 p.s.i.g. The liquid material in line 16 is pumped by means of pump 36 into the discharge line 18 from compressor 17. The mixture of compressed hydrogen and liquid hydrocarbons is then passed via line 19 into cooler 20. The cooled and compressed liquid hydrocarbons and hydrogen, as well as contaminating portions of normally gaseous hydrocarbons, are next passed into relatively high pressure separation zone 21.

Suitable conditions are maintained in high pressure separation zone 21 sufficient to yield a gaseous stream comprising hydrogen having reduced contaminant content which is removed via line 22, and to yield a liquid stream containing reformed hydrocarbons which are removed via line 23.

A portion of the upgraded hydrogen stream is recycled to the catalytic reforming zone via line 12. The remainder of the upgraded hydrogen stream is the net hydrogen produced and is passed via line 22 into cooler 24 under conditions sufficient to reduce the temperature of this net hydrogen stream to a temperature from 0° F. to 65° F. which temperature being at least 20° F. lower than the temperature maintained in high pressure separation zone 21. The chilled hydrogen stream is then passed via line 37 into separation zone 25 which is maintained under conditions sufficient to produce a net purified hydrogen product stream which is removed via line 26 for other uses which require hydrogen, such as a hydrodesulfurization reaction. A liquid stream containing $C_6+$ hydrocarbons is also separated in separator 25 and this liquid stream is passed via line 27 into admixture with the high pressure liquid stream in line 23. This mixture is then passed via line 28 into fractionator 29 which is maintained under a pressure of from 250 p.s.i.g. to 300 p.s.i.g., a top temperature of from 170° F. to 300° F., and a bottoms temperature from 300° F. to 400° F. Under these conditions, an overhead fraction is removed from column 29 via line 31, passed into condenser 32, and then into separator 33. A gaseous component comprising residual or dissolved hydrogen, methane, ethane, and ethane plus other normally gaseous hydrocarbons is withdrawn for utilization in other systems well known to those skilled in the art, such as fuel systems. The remaining light hydrocarbons comprising primarily ethane, propane, and butane, are withdrawn from the system via line 34. A bottoms product stream comprising primarily $C_6+$ hydrocarbons is withdrawn from the system via line 30.

The following examples are furnished to demonstrate some of the benefits to be achieved by the practice of the present invention.

Example I

A commercial scale catalytic reforming plant was designed to process a naphtha feedstock. The following data illustrates the composition of the various streams which may be separated in accordance with the present invention. All numbers shown are in mols per hour and reference should be made to the appended drawing for applicable line numbers.

| | Line No. | | | | | | | | | | | |
|---|---|---|---|---|---|---|---|---|---|---|---|---|
| | 13 | 16 | 15 | 23 | 12 | 22 | [1] 26 | [1] 27 | 28 | 35 | 34 | 30 |
| Component, mols/hour: | | | | | | | | | | | | |
| $H_2$ | 11,244.2 | 5.0 | 11,239.2 | 10.8 | 9,350.2 | 1,883.2 | 1,883.1 | 0.1 | 10.9 | 10.3 | 0.6 | |
| $C_1$ | 921.6 | 3.3 | 918.3 | 7.0 | 761.3 | 153.3 | 153.2 | 0.1 | 7.0 | 5.1 | 1.9 | |
| $C_2$ | 723.4 | 11.4 | 712.0 | 21.9 | 583.9 | 117.6 | 117.3 | 0.3 | 22.2 | 9.3 | 12.9 | |
| $C_3$ | 599.7 | 33.0 | 566.7 | 55.2 | 453.2 | 91.3 | 90.4 | 0.9 | 56.1 | 11.2 | 44.9 | |
| $iC_4$ | 155.4 | 22.1 | 133.3 | 31.4 | 103.2 | 20.8 | 20.2 | 0.6 | 32.0 | 3.3 | 28.7 | |
| $nC_4$ | 205.9 | 39.5 | 166.4 | 53.1 | 127.2 | 25.6 | 24.6 | 1.0 | 54.1 | 3.2 | 36.9 | 14.0 |
| $iC_5$ | 118.1 | 47.4 | 70.7 | 55.3 | 52.3 | 10.5 | 9.5 | 1.0 | 56.2 | | 0.9 | 55.3 |
| $nC_5$ | 72.1 | 33.6 | 38.5 | 38.1 | 28.3 | 5.7 | 5.0 | 0.7 | 38.8 | | 0.7 | 38.2 |
| $C_6+$ | 1,418.6 | 1,275.9 | 142.7 | 1,294.0 | 103.7 | 20.9 | 11.4 | 9.5 | 1,304.7 | | | 1,304.7 |
| Total | 15,459.0 | 1,471.2 | 13,987.8 | 1,566.8 | 11,563.3 | 2,328.9 | 2,314.7 | 14.2 | 1,582.0 | 42.4 | 127.5 | 1,412.1 |
| Lb./hr | 258,056 | 135,989 | 122,067 | 141,251 | 97,224 | 19,581 | 18,436 | 1,145 | 142,396 | 1,255 | 6,326 | 134,810 |
| Mol. Wt | 16.7 | 92.4 | 8.7 | 90.1 | 8.4 | 8.4 | 8.0 | 81.4 | 90.0 | 29.6 | 49.6 | 95.5 |
| B.p.s.d | | 11,850 | | 12,475 | | | | 110 | 12,585 | | 808 | 11,585 |
| Lb./gal | | 6.54 | | 6.46 | | | | 5.97 | 6.46 | | 4.46 | 6.64 |
| $10^6$ s.c.f.d | | | 127.2 | | 105.3 | 21.2 | 21.1 | | | 0.4 | | |

[1] 60° F. chiller.

It is to be noted that if chiller 24 is operated to produce a separator temperature of 60° F., 14 mols per hour of hydrocarbons may be recovered as valuable products. This recovery of hydrocarbons, of course, represents a significant increase in hydrogen purity which is yielded from the system. In addition, since separator 25 operates at a pressure substantially the same as separator 21, this purified hydrogen gas stream is available at a significantly higher pressure than a similar stream produced from prior art schemes which may utilize the low pressure reforming technique. It is believed that this absorption-cooling technique according to this invention may save from $10,000 to $15,000 per year in operating expenses for fuel and significant total savings per year in operating expenses for motive power to drive major pumps.

Example II

The typical prior art scheme previously referred to separates the effluent from the reforming reaction zone into a hydrogen fraction and a liquid product-containing fraction. The hydrogen fraction is then compressed and returned to the reaction zone. The reformed hydrocarbons are recovered from the liquid product, usually by fractionation. For comparative purposes, the following data is presented to show the conditions of operation for a typical prior art scheme and the conditions produced by operating the present invention. For ease of analysis, reference may be had to the appended drawing wherein, for the prior art case, the material in line 18 is tied directly into line 12 for recycle purposes and directly into line 26 for yielding a net hydrogen gas. This mode of operation will then be compared with the mode of operation shown in the appended drawing which represents one embodiment of the inventive method.

|  | Prior Art | | Invention | |
| --- | --- | --- | --- | --- |
| Line No | 12 | 26 | 12 | 26 |
| Component, mols/hour: | | | | |
| $H_2$ | 9,350.2 | 1,889.0 | 9,350.2 | 1,883.1 |
| $C_1$ | 776.7 | 156.9 | 761.3 | 153.2 |
| $C_2$ | 634.4 | 128.2 | 583.9 | 117.3 |
| $C_3$ | 561.9 | 113.5 | 453.2 | 90.4 |
| $iC_4$ | 149.2 | 30.2 | 103.2 | 20.2 |
| $nC_4$ | 194.4 | 39.3 | 127.2 | 24.6 |
| $iC_5$ | 91.2 | 18.4 | 52.3 | 9.5 |
| $nC_5$ | 50.6 | 10.2 | 28.3 | 5.0 |
| $C_6+$ | 198.9 | 40.2 | 103.7 | 11.4 |
| Total | 12,007.5 | 2,425.9 | 11,563.3 | 2,314.7 |
| Mol percent $H_2$ | 77.87 | 77.87 | 80.86 | 81.35 |
| $H_2/Hc$ | 6.0 | | 6.0 | |
| mM/s.c.f.d | 109.2 | 22.1 | 105.2 | 21.05 |

Thus, the above data clearly shows that significant improvement may be obtained in hydrogen purity, to wit: about 78% for the prior art scheme and about 81% for the inventive scheme.

The practice of the present invention achieves the characteristic of economy for those operations which produce a relatively impure hydrogen off-gas stream; for example, those operations which produce hydrogen off-gas in a purity from 50% to 80% by volume and which are operated at relatively low pressures, such as from 85 to 200 p.s.i.g. through the reaction system. It is submitted, however, that the practice of the present invention will, in fact, produce significant economy of operation over the prior art scheme illustrated in virtually every instance.

PREFERRED EMBODIMENT

Therefore, from the detailed description presented hereinabove, the preferred embodiment of this invention provides an improvement in a process for catalytic reforming of hydrocarbons in the presence of recycle hydrogen to produce high quality gasoline boiling range products which improvement comprises the steps of: (a) introducing the hydrogen-containing effluent from the reforming reaction zone into a first separation zone maintained under separation conditions including a temperature from 60° F. to 120° F. and a pressure from 85 p.s.i.g. to 200 p.s.i.g.; (b) withdrawing from said first separation zone a gaseous stream comprising hydrogen contaminated with $C_2+$ hydrocarbons, and a liquid stream containing relatively high quality gasoline boiling range products; (c) compressing said gaseous stream to a pressure at least 50 p.s.i.g. higher than said first separation zone pressure; (d) admixing said compressed gaseous stream with at least a major portion of said liquid stream of step (b); (e) introducing said admixture into a second separation zone maintained under separation conditions including a temperature from 60° F. to 120° F. and a pressure from 135 p.s.i.g. to 300 p.s.i.g. said pressure being at least 50 p.s.i.g. higher than said first separation zone pressure; (f) withdrawing from said second separation zone a hydrogen stream having reduced contaminant content, and a liquid fraction containing relatively high quality gasoline boiling range products; (g) returning a portion of said hydrogen stream of step (f) to the reforming reaction zone; (h) passing the remainder of said hydrogen stream of step (f) into a chilling zone under conditions sufficient to reduce the temperature of said remainder to a temperature from 0° F. to 65° F., said temperature being at least 20° F. lower than the temperature of said second separation zone; (i) introducing said chilled hydrogen stream into a third separation zone maintained under separation conditions sufficient to produce a net hydrogen product stream, and a liquid stream containing $C_6+$ hydrocarbons; (j) passing said liquid stream of step (i) and said liquid fraction of step (f) into a fractionation zone; and, (k) recovering a product stream comprising high quality gasoline boiling range products.

The invention claimed:

1. Method for the conversion of hydrocarbons in the presence of hydrogen which comprises converting feed hydrocarbons in a reaction zone under hydrogen producing conditions including a relatively low pressure; separating the effluent from the reaction zone under said relatively low pressure into a hydrocarbon liquid phase and a hydrogen-containing gas phase; increasing the pressure of said gas phase and said liquid phase to a relatively high pressure; admixing said high pressure gas and liquid phases and separating the resulting admixture into a recycle hydrogen gas stream and a liquid hydrocarbon stream; returning a portion of said recycle gas to said reaction zone; cooling the remaining portion of said recycle gas under conditions sufficient to condense at least a portion of the hydrocarbons contained therein; separating said cooled gas into a gaseous stream and a liquid fraction containing said hydrocarbons; admixing said condensed hydrocarbons and said liquid hydrocarbon stream; introducing said admixture into a fractionation zone under conditions sufficient to produce a first product stream comprising normally gaseous hydrocarbons, and a second product stream comprising normally liquid conversion products.

2. Method according to claim 1 wherein said relatively high pressure is at least 50 p.s.i.g. higher than said relatively low pressure.

3. Method according to any one of claims 1 and 2 wherein said cooling conditions include a temperature from 0° F. to 65° F.

4. Method according to any one of claims 1, 2, and 3 wherein said conversion zone comprises catalytic reforming utilizing a platinum containing catalyst sufficient to convert hydrocarbons into gasoline boiling range conversion products having significant quantities of aromatic hydrocarbons therein.

5. In a process for catalytic reforming of hydrocarbons in the presence of recycle hydrogen to produce high quality gasoline boiling range products, the improvement which comprises the steps of:
(a) introducing the hydrogen-containing effluent from the reforming reaction zone into a first separation zone maintained under separation conditions including a temperature from 60° F. to 120° F. and a pressure from 85 p.s.i.g. to 200 p.s.i.g.;
(b) withdrawing from said first separation zone a gaseous stream comprising hydrogen contaminated with $C_2+$hydrocarbons, and a liquid stream containing relatively high quality gasoline boiling range products;
(c) compressing said gaseous stream to a pressure at least 50 p.s.i.g. higher than said first separation zone pressure;
(d) admixing said compressed gaseous stream with at least a major portion of said liquid stream of step (b);
(e) introducing said admixture into a second separation zone maintained under separation conditions including a temperature from 60° F. to 120° F. and a pressure from 135 p.s.i.g. to 300 p.s.i.g., said pressure being at least 50 p.s.i.g. higher than said first separation zone pressure;
(f) withdrawing from said second separation zone a hydrogen stream having reduced contaminant content, and a liquid fraction containing relatively high quality gasoline boiling range products;
(g) returning a portion of said hydrogen stream of step (f) to the reforming reaction zone;
(h) passing the remainder of said hydrogen stream of step (f) into a chilling zone under conditions sufficient to reduce the temperature of said remainder to a temperature from 0° F. to 65° F., said reduced temperature being at least 20° F. lower than the temperature of said second separation zone;
(i) introducing said chilled hydrogen stream into a third separation zone maintained under separation conditions sufficient to produce a net hydrogen product stream, and a liquid stream containing $C_6+$ hydrocarbons;
(j) passing said liquid stream of step (i) and said liquid fraction of step (f) into a fractionation zone; and (k) recovering a product stream comprising high quality gasoline boiling range products.

References Cited

UNITED STATES PATENTS

| | | | |
|---|---|---|---|
| 2,931,768 | 4/1960 | Mathy et al. | 208—101 |
| 2,985,583 | 5/1961 | Gilmore | 208—101 |
| 3,296,118 | 1/1967 | Czajkowski et al. | 208—100 |
| 3,402,122 | 9/1968 | Atwater et al. | 208—101 |
| 3,425,931 | 2/1969 | Penisten et al. | 208—101 |
| 3,431,195 | 3/1969 | Storch et al. | 208—101 |
| 3,470,084 | 9/1969 | Scott | 208—101 |

HERBERT LEVINE, Primary Examiner

U.S. Cl. X.R.

208—102, 103, 104, 105, 138, 346